United States Patent
Kiss

[11] Patent Number: 5,282,431
[45] Date of Patent: Feb. 1, 1994

[54] PROCESS FOR RENDERING USABLE DISPOSAL PRODUCTS

[75] Inventor: Günter H. Kiss, Le Florestan, Monaco

[73] Assignee: Thermoselect Aktiengesellschaft, Liechtenstein, Liechtenstein

[21] Appl. No.: 889,784

[22] Filed: May 28, 1992

[30] Foreign Application Priority Data

Sep. 10, 1991 [DE] Fed. Rep. of Germany ....... 4130416

[51] Int. Cl.⁵ .............................................. F23G 5/00
[52] U.S. Cl. .................................... 110/346; 110/223; 110/245; 422/139
[58] Field of Search ............... 110/223, 235, 346, 245; 422/139; 588/223, 229

[56] References Cited

U.S. PATENT DOCUMENTS

| | | |
|---|---|---|
| 3,842,762 | 10/1974 | Sargent et al. |
| 4,534,302 | 8/1985 | Pazar . |
| 4,553,285 | 11/1985 | Sachs et al. |
| 4,561,860 | 12/1985 | Gulley et al. ................... 110/223 X |
| 4,650,546 | 3/1987 | Le Jeune . |
| 4,667,608 | 5/1987 | Chang ............................ 110/223 X |

FOREIGN PATENT DOCUMENTS

2628866 1/1978 Fed. Rep. of Germany .

Primary Examiner—Edward G. Favors
Attorney, Agent, or Firm—Locke Reynolds

[57] ABSTRACT

A process for rendering usable disposal products is described, in which unsorted pollutant-containing industrial, domestic and/or special refuse undergoes a high temperature treatment. Accompanied by the entraining of existing liquid fractions and while maintaining its mixed and combined structure, the disposal product is compressed batchwise to compact packs. While maintaining the pressure action it is subsequently positively introduced into a channel heated to over 100° C. and is kept in sliding, non-positive contact with the channel walls until the initially present liquids are evaporated and mechanical restoring forces of individual disposal product components are eliminated. The entrained organic constituents at least partly assume a binder function. The shape and structurally stable, lumpy solid conglomerate forced out of the channel in this state is introduced into a high temperature reactor maintained at at least 1000° C. and forms therein a gas-permeable bed.

14 Claims, 1 Drawing Sheet

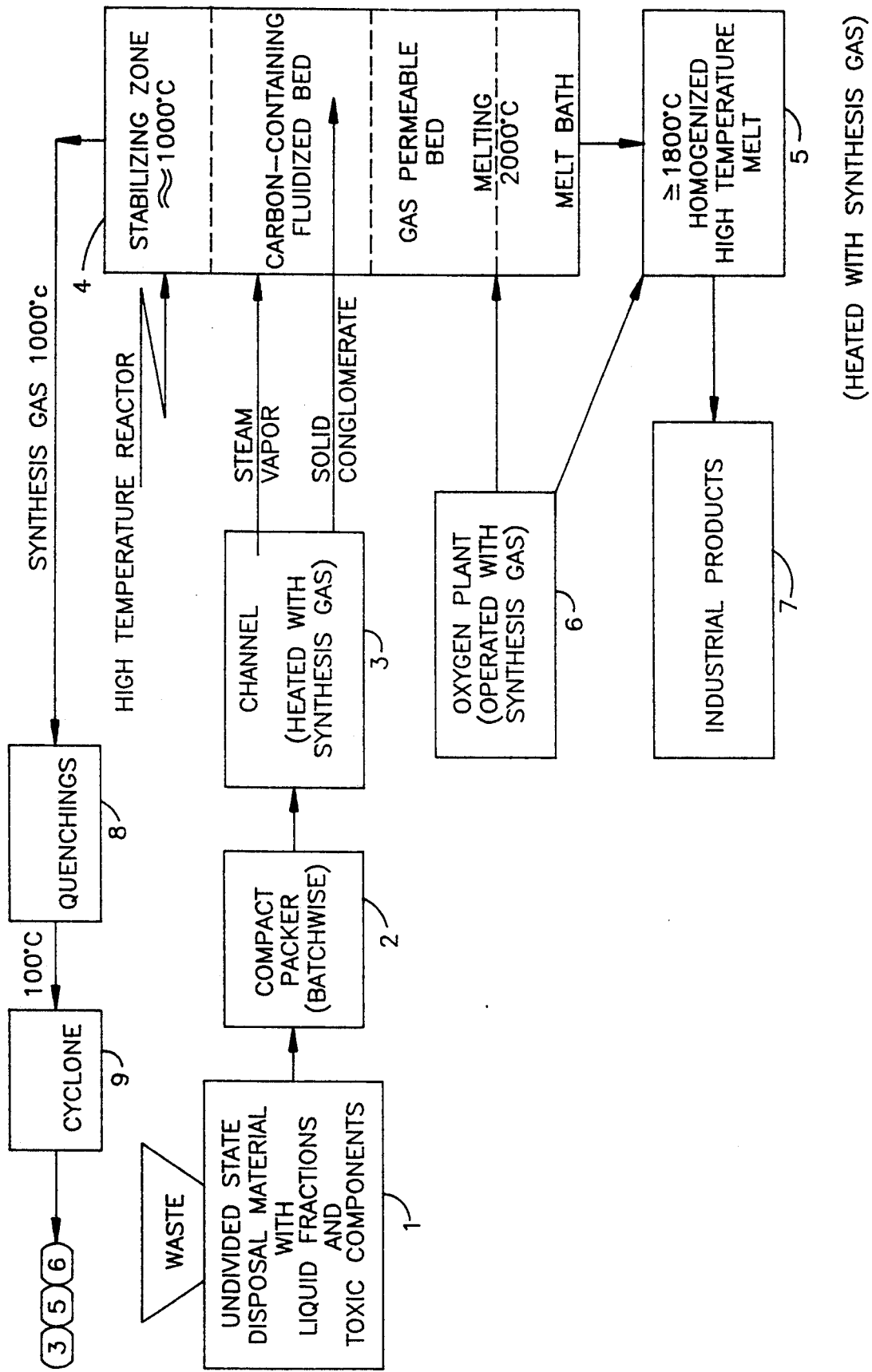

PROCESS FOR RENDERING USABLE DISPOSAL PRODUCTS

The invention relates to a process for rendering usable disposal products of all types, in which unsorted, untreated industrial, domestic and special refuse containing random pollutants in solid and/or liquid form, as well as industrial product wrecks are subject to a high temperature action. The invention particularly relates to such a process wherein the high temperature action achieves a thermal separation or material conversion accompanied by maximum energy utilization of the solid residues obtained which are converted into a high temperature melt.

BACKGROUND OF THE INVENTION

The known waste disposal processes such as land fills, recycling, refuse incineration, and pyrolytic reaction do not provide a satisfactory solution to the growing refuse problems. The processes often contribute to and are an essential factor in destroying the environment.

Industrial product wrecks of composites, such as vehicles and household appliances, as well as oils, batteries, paints, varnishes, toxic slurries, medicaments and hospital waste are subject to strict, legally prescribed disposal regulations. However, domestic refuse is an uncontrolled, heterogenous mixture, which can contain virtually all types of special refuse fractions and organic constituents, whose disposal is in no way related to its harm to the environment.

Domestic refuse typically is stored inadequately in dumps from which digester gases and carbon dioxide escape in an uncontrolled manner into the atmosphere, and pollutant-containing liquids and eluates of the dumped waste pollute the ground water.

In order to reduce the treated refuse quantity it has already been proposed that the organic constituents of domestic refuse and sewage sludges be composted. However, this ignores the fact that these organic substances are heterogeneous and contain a large number of non-degradable toxic constituents such as chemicals, medicament and heavy metal residues, which remain in the compost and are returned to the biological cycle via plants and animals.

By recycling so-called valuable products an attempt is once again made to reduce the refuse quantity. However, this ignores the high costs involved in the separate collection and treatment of such waste and with repeated recycling the costs and prejudice to the environment increase, accompanied by a reduction in the usability of the products obtained.

In known refuse incineration plants the products for disposal pass through a broad temperature range up to approximately 1000° C., at which mineral and metallic residual substances are not melted. The energy inherent in the remaining solids is not utilized. The short residence time of the refuse at higher temperatures and the large amount of dust produced by blowing in large quantities of nitrogen-rich combustion air into the uncompressed disposal products favor the dangerous formation of chlorinated hydrocarbons. Therefore the waste gases from refuse incineration plants undergo afterburning at higher temperature. In order to justify the high costs involved in such plants, the abrasive and corrosive hot gases with their high dust quantities are passed through heat exchangers. During the relatively long residence time in the heat exchanger chlorinated hydrocarbons are once again produced through denovo synthesis, which chlorinated hydrocarbons combine with the entrained dust and lead to highly toxic filtrates. It is scarcely possible to estimate the resulting damage and the costs involved in their elimination.

Despite the high technical expenditure of the prior art, after combustion approximately 40% of the refuse to be disposed of is left behind in the form of ash, slag and highly toxic filtrates, whose dangerousness level can be compared with that of radioactive waste and which must be disposed of in cost-intensive manner. In order to reduce the volume to be dumped, it is known to separate the metallic components from the residual substances and supply them for separate use. The remaining ash and slag undergo a high temperature melting process which involves high energy costs. As a result of the heterogeneous starting substances to be melted, the slag is inhomogeneous and contains considerable proportions of organic residual substance particles which, surrounded by the liquid melt, are not oxidized.

As a result of shock-like cooling of the melt in a water bath a heterogeneous melt granular material is obtained, which shatters in uncontrolled manner at its thermal breakage points, so that the enclosed pollutants can be eluted again. A high energy expenditure of hitherto approximately 200 litres of fuel oil per tonne of melt remains unused, because the thus obtained melt granular material can only be employed as a filler in road building and the like.

In conventional reactors the hitherto used pyrolysis processes have a wide temperature spectrum similar to refuse incineration. High temperatures prevail in the gasification zone. The hot gases which form are used for preheating the not yet pyrolyzed disposal material, cool and pass through the temperature range relevant for the formation of chlorinated hydrocarbons and which therefore represents a hazard.

All known pyrolysis processes for unsorted, unbound and drained disposal products do not provide an adequately gas-permeable bed, require excessive energy costs in the case of inadequate gas production and also long residence times in the reactor. As a result of the heat flow and the internal gas pressure there are large amounts of dust produced which consequently require large filter capacities. If water gas is to be produced, then it is necessary to add separately produced superheated steam, i.e. extraneous steam to the gasification zone. The remaining solids are generally not melted and must instead be supplied to separate disposal and can therefore be compared with a conventional refuse incineration plant.

In order to produce ecologically unobjectionable, usable pure gas, the pyrolysis gases generally pass through a cracker prior to purification. By using a heat exchanger, it is also known to utilize the thermal energy inherent in the hot gases. However, as a result of the residence time of the gases in the heat exchanger chlorinated hydrocarbons form, which are released during the thermal utilization of the gas obtained.

When using shaft furnaces for refuse incineration, inter alia the important disadvantage of sticking together and bridge formation of the disposal products to be pyrolyzed in the furnace occurs, so that it is necessary to equip such reactors with mechanical aids, such as poking bars, vibrators and the like, without providing a satisfactory solution for the problem.

Revolving tube and fluid bed gasifiers, due to the mechanical abrasion on the furnace wall as a result of the in part sharp-edged disposal products, lead to long shutdown times, extremely high dust formation and require technically complicated, gas-tight locks. This leads to a large amount of maintenance with the correspondingly high costs.

To avoid the disadvantages of the above-described refuse incineration and pyrolysis processes, it is also known to decompose waste and toxic substances by means of a mineral or metallic high temperature melting or molten bath, or to feed the waste into the latter, so as in this way to ensure a rapid Pyrolytic decomposition of the disposal products at high temperatures. The essential disadvantage of such a procedure is that a utilization of the liquid and/or wet waste is impossible due to the explosion-like deflagration risk and as a result of the high pressures which occur from the gases which form which do not have an adequately long residence time in the melt in order to reliably destroy organic pollutants. In the case of dried, non-degassed organic waste the gas pressure through the decomposing organic products is too high to ensure an adequately long residence time. After a short time the melt products are saturated with non-oxidizable carbon particles enveloped by melt liquid, so that it is not appropriate to supply further disposal products.

In another known thermal process for refuse disposal initially mineral and metallic products are separated from organic constituents, the separated organic constituents are dried and then pulverized. The powder obtained is introduced into a high temperature molten bath or a combustion chamber having an appropriate temperature and by blowing in oxygen or oxygen-enriched air is immediately decomposed and the pollutants are destroyed.

Although from the ecological standpoint this process leads to satisfactory results, it still has significant disadvantages. Thus, e.g. no liquid waste and disposal products can be disposed of in combined structures and the resulting costs are un-acceptable.

The previously described combusion and pyrolysis processes jointly suffer from the disadvantage that the liquids or solids evaporated during combustion or pyrolytic decomposition are mixed and led off with combusion or pyrolysis gases before they have reached the temperature and residence time in the reactor necessary for destroying all pollutants. The evaporated water is not made usable for water gas formation. Thus, generally, after-burning chambers are provided in refuse incineration plants, and crackers are provided in pyrolysis plants.

The present invention aims at providing a process of the aforementioned type, which the aforementioned disadvantages are obviated in the case of random disposal products, so that there is no harm to the environment and simultaneously it is possible to obtain high-grade, widely usable and semifinished or finished industrial products from the residual materials, while minimizing the technical expenditure and process costs necessary for this.

SUMMARY OF THE INVENTION

The goals of the present invention are achieved by a process of compressing batches of disposal products, whether in undivided state or divided into large pieces, into compact packs of pre-defined cross-section containing a heterogenous mixture of disposal products entraining any existing liquid fractions. The compact packs and entrained liquid fractions are serially introduced into a channel having a configuration generally conforming to the cross-section of the compact packs so that an outside surface of each compact pact tightly bears on an inside surface of the channel. The channel is heated to over 100° C. and maintains a compressing pressure on the compact packs by virtue of the contact between the outer surface of the compact packs and the inside surface of the heated channel until any initially present liquids are evaporated and the inherent mechanical restoring forces of individual disposal product components are eliminated. The compact packs are then kept in sliding, non-positive contact with the channel walls until any entrained organic constituents have at least partly assumed a binder function to form structurally stable lumpy solid conglomerate units which emerge from the channel in a manner maintaining the structural integrety of the units into a high temperature reactor kept at at least 1000° C. over its entire volume.

In the present process the industrial product wrecks, such as refrigerators, washing machines, electrical and electronic equipment in the whole state, motor vehicles in large pieces, are batchwise compressed together with unsorted and unpretreated refuse and liquid waste in such a way that the hollow cavity volume is minimized, the solid components of the disposal products form a high mechanical union, and the existing excess liquids are pressed together into the resulting compact packs which are inserted into an elongated channel heated from the outside. The compact packs form a gas-tight plug upstream of the channel inlet into the high temperature reactor which takes over the lock function as a result of the gas-impermeability of the compact packs and the coordinate fit between the compact packs and the channel walls. The liquids do not have to undergo any separate disposal since any existing liquid fractions are entrained in the compacted packs. Also, there is no need to heat any thermally insulating air since the compression of the compact packs minimizes the hollow cavity volume. The thermal conductivity in the compact pact obtained by compressing is significantly improved by the higher density of any metallic and mineral constitutents. High disposal capacities are obtained even in small plants, without requiring cost-intensive pretreatment processes such as separate collection and technically complicated preparation, shredding, cutting up, drying and briquetting.

Additional features and advantages of the invention will become apparent to those skilled in the art upon consideration of the folowing detailed description of a preferred embodiment exemplifying the best mode of carrying out the invention as presently perceived. The detailed description particularly refers to the accompanying drawing.

BRIEF DESCRIPTION OF THE DRAWINGS

The FIGURE is a block diagram of the process of the present invention.

DESCRIPTION OF THE PREFERRED EMBODIMENT

In the present invention, a heterogeneous mixture of disposal products of all kinds is received at input 1. The refuse may be domestic refuse or industrial refuse. Such waste may not only consist of solids, but may also contain various liquid constituents such as are included, e.g., in vegetable waste and also in used bottles, paint cans and the like. The heterogeneous composition of the disposal products, more often than not, also involves toxic constituents which are of unknown provenience. Where the received disposal products are of particularly large volume, e.g., automobile wreckage, used refrigerators or the like, the input product's large pieces are torn apart or otherwise comminuted prior to further processing.

Following any such processing at input 1, the refuse undergoes compression 2 into packs at such a pressure that the pack volume comprises hardly any air spaces. The compressing step can be performed on the disposal product in a time separated manner with respect to the following process stages, in such a way that said compact packs are independently transportable and at least temporarily storable, largely sterile and of low-odor and of predetermined shape and size. After the compressing operation, the highly compacted refuse, together with any incorporated liquid fraction, is introduced in a batch-wise fashion into the entrance of a heated channel 3 in form-locking manner without the exerted pressure on the highly compacted refuse being reduced. This occurs in practice by making a piston cylinder press work directly into said channel 3. The interposition of an appropriate slider is, however, advantageous.

It is important for the process that the compact packs pressed in a form-locking manner into the channel 3 are heated to over 100° C. while maintaining the pressure action in a positive, tightly bearing manner through frictional contact with the inside wall of the channel 3. With the build up of gas pressure the compact packs are only kept in positive contact with the channel walls until the entrained liquids and readily volatile substances have evaporated and the existing restoring forces of individual components have been eliminated. Thereafter any entrained organic constituents at least partly take over the binder functions.

Introducing the compact packs into the heated channel in form-locking manner means that the outer circumferential shape of the compressed packs of disposal products corresponds to the inner circumference of the channel walls so that the compact packs, intermittently pushed into the channel, tightly bear on the inside wall of the channel 3. Thus, direct transmission of heat to the refuse is ensured from the channel walls which are heated from the outside,. Any air gap between the pack of refuse and the heated wall of the channel would detrimentally slow down the heat transmission and, therefore, adversely affect the energy balance of the process. That is why it is important that, when pushing through the compact packs successively fed into the entrance of the channel, the tight contact, i.e., the force-locking contact between inside wall of the channel and compact pack be maintained, said contact being essential to the invention. The force-locking contact should be maintained at least until any liquid present is completely evaporated and the mechanical restoring forces inherent in the refuse are neutralized.

The source of these restoring forces is that force produced in reaction to the prior pack compression step, e.g., the force of a compressed plastic dish, of a bent-over derrick pole, or the like. Upon any release of the pressure, the elastic character of such objects included in the packs would normally cause, at least in part, a spring-back into the original form. Such restoring forces are slowly neutralized by thermal action when at least part of the organic constituents present in the refuse become cemented or sintered to the remaining constituents. Thus, the pressure-tight contact between the inside wall of the channel and the solid conglomerate pack diminishes with progressive movement along the channel 3.

In the present process there is no pyrolytic decomposition of the organic constituents in the channel 3, although a partial decomposition can be desirable. The heat in the channel is sufficient to bind all the fines and to produce lumpy conglomerates having a structurally stable shape. In the inventive process sequence, after a short residence time of the disposal product in the heated channel, a compact strand is formed in which are bound any dust and fines introduced with the disposal product. A rapid, thorough warming of the disposal product is ensured as a result of an adequately rapid gas evolution in the marginal areas of the strand with increased pressure. At least components of many organic constituents are plasticized by the heat in such a way that the restoring capacity of these constituents is eliminated. The intimate positive pressure contact with the walls of the channel forces any gases forming on the hot channel wall to flow further inwards through the disposal product packs in the process direction. The hot gases cause the disposal products to stick, sinter and bond together, and give off their moisture, so that a dust-free, and structurally stable lumpy conglomerate shape is obtained at the channel outlet end.

These lumpy solid conglomerates pass out of the channel end into the shaft of a high temperature gasifier 4 and forms a precursor for a gas-permeable, dust-free bed in the high temperature reactor. The solid conglomerate issues through the exit end of the heated channel in the form of an endless strand in a batchwise manner and, in doing so, falls apart in lumps. A mixed gas formed from the evaporated liquids and the relatively readily volatile fractions of the originally solid constituents issues through the exit end with the solid conglomerate.

Both, the gassed constituents and the solid conglomerates, are, when leaving the channel 3, fed without pressure into the high-temperature reactor 4. Since the high-temperature reactor, at each point of its internal volume, has a temperature of at least 1000° C. and since a reducing atmosphere exists at the point at which the solid lumps enter the reactor, at least the surface of the solid lumps pyrolyzes abruptly and completely so that the lumps falling down are not cemented to one another in the reactor.

The thermally pretreated compact packs become pressureless immediately on passing out of the heated channel and act as briquettes in the high temperature gasifier 4. The high temperature reactor is characterized in that it is kept at at least 1000° C. over its entire volume. Thus, at least the surfaces of the entering compact packs or the separated lumps dropping therefrom are suddenly carbonized with respect to their organic constituents. The briquetted lumps form with their inherent energy a loose, gas-permeable bed in the high temperature gasifier 4.

The formation of explosive gaseous mixtures in the entire system is prevented as a result of the thermal pretreatment in the channel 3. All the gaseous and solid disposal products are exposed to high temperature action in the reactor 4 for a time sufficiently long to reliably ensure the destruction of all thermally reactable pollutants. The organic constituents of at least the outer regions of the solid lumps are immediately pyrolytically decomposed when entering the high temperature reactor, thus ensuring that there is no sticking of the bed column, or bridge formation and adhesion to the reactor walls. The solid lumps form a carbon-containing fluidized bed. Carbon dioxide, which forms during the gasification of the carbon with oxygen, is transformed into carbon monoxide through passing through the bed column. the water vapor of the starting material liquid entrained with the compacting and which is released in the heated channel also passes through the bed. This advantageously ensures the sequence of a water gas reaction without extraneous steam being required.

From the lumps within the reactor and below the feed level, a gas-permeable solid bed will result which, in its lower region, is defined by a burner and melt plane, into which, pure oxygen or, at least, air enriched by oxygen is fed, for complete burning of the organic constitutents. In the melt plane, the temperature amounts to about 2000° C. Thus, a temperature gradient of about 1000° C., in upward direction, is given within the gas-permeable solid bed.

Above said fluidized bed, i.e. in the top region of the reactor, a stabilizing zone will result in which any toxic hydrocarbon compounds being obtained are destroyed by the present minimum of 1000° C. As this high temperature over the fluidized bed, all the gases pass with a sufficiently long residence time to ensure that chlorinated hydrocarbons are reliably destroyed and long-chain hydrocarbons are cracked. Thus, the formation of condensates, such as tars and oils is reliably prevented.

Within said solid bed, the air-carbon reaction occurs, while above the solid bed, in the supply region of the solid conglomerate and the vaporous constituents, a carbonaceaous fluidized bed will result, brought about by the carbon particles which fall off thue pyrolyzed surfaces of the solid lumps. Within the aforementioned carbonaceous and carbon-monoxide-containing fluidized bed zone, the water-gas reaction occurs, i.e. the water vapor flowing in from the channel 3, heated in the reactor 4, is cracked in known manner so that synthesis gas will be produced which leaves the reactor at the prevailing temperature of 1000° C.

The synthesis gas mixture at at least 1000° C. is cooled in shock-like manner to 100° C. immediately after leaving the high temperature reactor and the dust is removed, so that there can be no re-formation of chlorinated hydrocarbons. In order to prevent the reformation of dioxins and furans from occurring, the hot synthesis gas is subjected to shock-like quenching 8 so that it may subsequently be freed from the finely divided solid parts at a temperature of as low as approximately 100° C. in a cyclone separator 9 or other dust separator.

The synthesis gas thus purified may be used both for heating the channel 3 and for operating the oxygen plant 6 for the production of oxygen for use within the burner zone of the high-temperature reactor 4. Since the melt bath accumulating at the bottom of the reactor 4 still does not provide a melt of homogeneous structure, this melt is subjected to a further homogenizing and high-temperature treatment 5, in which case a high temperature of at least 1800° C. is also created and maintained by means of the aforementioned synthesis gas.

The oxygen is produced in an oxygen plant 6 of conventional type of construction, such as is known in line with the state of the art for the production of oxygen. It is only the melt, recovered in the homogenizing kiln 5, which, throughout, is of such a structure that products can be made therefrom which exhibit the mechanical capacity to withstand stresses or take loads, strength, abrasive resistance, capacity to withstand temperature loads, hardness and more of the like, and thus are high-performing to such an extent that they may be called high-grade products.

The melting of the solid fragments with high temperature reaction within the reactor 4 preferably takes place at temperatures around 2000° C. or higher. These temperatures occur during carbon gasification, accompanied by the addition of oxygen. In the melting zone of the high temperature reactor below the fixed bed, the inorganic constituents, i.e. all glasses, metals and other minerals are melted. Part of the heavy metals contained in the solids occur in elementary form in the reducing atmosphere while another part can form alloys with the other components of the melt. The molten form is discharged and optionally can be fractionated.

During the high temperature treatment, in the case of an exothermic process sequence, most of the pyrolysis coke is burnt and all the oxidizable components of the residual substances are oxidized and the mineral components completely liquified. This takes place at temperatures of approximately 2000° C. and higher. The melt removed has a largely inhomogeneous structure in the case of disposal material supplied in unsorted manner. Higher melting components, e.g. carbon and also certain metals, are still in their solid aggregate state and form inclusions so that it is not possible to appropriately utilize the slag-like residual products.

It is therefore important and essential for the present process that the residual products present in molten form and which on average still form 1% by volume of the starting disposal products, undergo an additional aftertreatment, in which they are subject to a thermal homogenization process while making use of the synthesis gas obtained. The melt is left in the oxidizing atmosphere at temperatues around 1800° C. until a bubble-free, homogeneous high temperature melt exists. In a process variant, the inhomogeneous melt passing out of the high temperature reactor is firstly vigorously mixed in a container or a thorough mixing can also in part take place during the outflow of the melt. An adequate melting volume obtained during the continuous process sequence can, if desired, be drawn off in fractionated manner during or after the refining process on the basis of density separation. Within the high temperature melt are completely eliminated all inhomogeneous structures, so that even long-term elutability can be excluded. This high temperature melt is characterized by a complete material conversion with respect to all the original starting materials.

The present process is Particularly advantageous in that the product obtained with the high temperature melt can be processed to a broad range of high-value industrial products or high-value semifinished products. Utilizing the inherent energy, i.e. without intermediate cooling with respect to the melt, it is possible to produce from the latter a high-grade industrial product. For example the melt can be spun into mineral fibres. However, it is also possible to produce from the said melt by casting processes high-grade machine parts, such as gears and the like. Known shaping and molding processes can be used for other high-grade industrial products. Insulators with a low volume weight can be produced by expansion processes. It is possible to predetermine in an optimum manner the viscosity of the high temperature melt on a product and processdependent manner, i.e. as a function of the spinning, casting, shaping or molding process.

The above process makes it possible for the first time to bring about a comprehensive, universal disposal obviating the need for separate collection and preparation, such as shredding, cutting up, drying and briquetting, as well as recycling of the materials in question. The entrained liquids are utilized in energy form by water-gas reaction. All the gaseous, liquid and solid disposal products are kept in a high temperature reactor at a minimum temperature of over 1000° C. until all the pollutants have been thermally destroyed. The re-formation of chlorinated hydrocarbons is completely prevented by a shock-like cooling of the gases and residual substances discharged in liquid form can, optionally after the separation of the metal fractions, be further processed to high-grade industrial products, whilst utilizing their inherent energy.

Although the invention has been described in detail with reference to the preferred embodiment, variations and modifications exist within the scope and spirit of the invention as described and as defined in the following claims.

I claim:

1. A process for rendering usable disposal products of all types including unsorted and untreated industrial, domestic and special refuse containing random pollutants in solid and liquid form, as well as industrial product wrecks wherein the disposal products undergo a high temperature action resulting in a thermal separation and material conversion accompanied by maximum energy utilization of the solid residues obtained which are converted into a high temperature melt, the process comprising the steps of:
   compressing batchwise the disposal products and accompanying entrained liquid fractions while maintaining its mixed and combined structure into compact packs;
   introducing the compact packs into a channel heated to over 100° C., the compact packs having a cross-sectional shape corresponding to the channel for maintaining the pressure of the compressing step;
   keeping the compact packs of products in sliding, frictional contact with the channel walls until the initially present liquids are evaporated and the inherent mechanical restoring forces of individual disposal product components are eliminated, and until the entrained organic constituents have at least partly assumed a binder function that maintains the disposal products in a lumpy solid conglomerate shape; and
   extruding the lumpy solid conglomerate shape in a structurally stable manner out of the channel in this state into a high temperature reactor kept over its entire volume at at least 1000° C.

2. A process according to claim 1 wherein the compressing step comprises a batchwise compacting of the disposal product so that there is a minimizing of the originally present cavity volume and a mechanical union of any solid components.

3. A process according to claim 1 wherein the extruding step further comprises the steps of: discharging structurally stable, solidified conglomerate lumps in dry, fragmentary form from the heated channel; and introducing any readily volatile constituents immediately and directly into the high temperature reactor, the volatile constituents including water vapor forming a part of a hot, synthesis gas mixture within the reactor.

4. A process according to claim 3 further comprising the step of forming within the high temperature reactor a gas-permeable bed up to the level of the entrance to the heated channel with the solid lumps.

5. A process according to claim 4 further comprising the step of keeping the level of the bed constant, so that immediately after leaving the heated channel the organic constituents of the solid lumps are at least in the outer areas immediately pyrolytically decomposed, the solid lumps containing any residual organic constituents forming a carbon-containing fluidized bed.

6. A process according to claim 5 further comprising the step of gasifying any carbon constituents in the fluidized bed to carbon dioxide by the dosed addition of oxygen, so that when the carbon dioxide passes through the carbon-containing fluidized bed it is converted into carbon monoxide.

7. A process according to claim 6 further comprising the step of passing over the surface of the carbon-containing fluidized bed derived from the thermally decomposed, carbonized marginal regions of the carbon lumps the water vapor formed in the heated channel from the entrained liquid fractions of the disposal products and discharged from the heated channel during the heat treatment of the compact packs.

8. A process according to claim 7 further comprising the steps of: destroying in a stabilizing zone at at least 1000° C. over the fluidized bed all the chlorinated hydrocarbon compounds; and cracking the long-chain hydrocarbon compounds formed during the thermal decomposition of organic constituents while preventing the formation of condensates.

9. A process according to claim 8 further comprising the steps of: cooling in a shock-wise manner the hot synthesis gas mixture from a temperature of at least 1000° C. immediately upon leaving the high temperature reactor until cooled to below 100° C.; and then removing the dust from the cooled gas mixture.

10. A process according to claim 9 further comprising the steps of: melting at temperatures over 2000° C., any metallic and mineral constituents formed during carbon gasification with oxygen; subjecting the then obtained liquid melt to a separating process and drawing off the metallic and mineral constitutents in fractionated form.

11. A process according to claim 10 further comprising the steps of: maintaining the mainly mineral high temperature melt left after high temperature gasification in liquid phase in an oxidizing atmosphere until there is a completely refined, bubble-free, homogeneous melt with a composition similar to a natural product.

12. A process according to claim 11 further comprising the step of: forming high-grade industrial products from the homogenized high temperature melt while using at least a considerable part of the inherent energy thereof by one or more processes selected from the group consisting of spinning, shaping, molding and expanding.

13. A process according to claim 12 further comprising the step of: using the synthesis gas obtained for heating the channel and the high temperature reactor, for refining the melt, and for operating an oxygen plant by gas motors or turbines.

14. A process according to claim 1 where the compressing step is performed on the disposal product in a time separated manner with respect to the following process stages, in such a way that said compact packs are independently transportable and at least temporarily storable, largely sterile and of low-odor and of predetermined shape and size.

* * * * *